(12) United States Patent
Moon et al.

(10) Patent No.: US 8,036,635 B2
(45) Date of Patent: Oct. 11, 2011

(54) SYSTEM AND METHOD FOR PROVIDING SERVICE IN A COMMUNICATION SYSTEM

(75) Inventors: Sang-Jun Moon, Yongin-si (KR); Sung-Won Lee, Seongnam-si (KR); Dong-Keon Kong, Suwon-si (KR); Dae-Seok Kim, Seoul (KR); Young-Ky Kim, Seoul (KR); Joon-Ho Park, Seongnam-si (KR); Poong-Ki Min, Seoul (KR); Hyeon-Jin Kang, Seoul (KR); Ji-Hye Ha, Seoul (KR)

(73) Assignee: Samsung Electronics Co., Ltd. (KR)

( * ) Notice: Subject to any disclaimer, the term of this patent is extended or adjusted under 35 U.S.C. 154(b) by 1041 days.

(21) Appl. No.: 11/865,474

(22) Filed: Oct. 1, 2007

(65) Prior Publication Data
US 2008/0081593 A1    Apr. 3, 2008

(30) Foreign Application Priority Data

Sep. 30, 2006 (KR) .......................... 10-2006-0096691
Apr. 27, 2007 (KR) .......................... 10-2007-0041641

(51) Int. Cl.
*H04Q 7/20* (2006.01)
(52) U.S. Cl. .......................... 455/406; 455/408; 370/338

(58) Field of Classification Search ............... 455/422.1, 455/406–408, 414.1–414.4, 466; 370/328, 370/329, 338, 352, 395.21, 401, 466
See application file for complete search history.

(56) References Cited

U.S. PATENT DOCUMENTS

| 7,583,612 | B2 * | 9/2009 | Lin ................................. 370/252 |
| 2006/0209891 | A1 * | 9/2006 | Yamada et al. ............... 370/468 |
| 2008/0104201 | A1 * | 5/2008 | Moon et al. .................. 709/218 |
| 2008/0107092 | A1 * | 5/2008 | Taaghol et al. ............... 370/338 |
| 2009/0034428 | A1 * | 2/2009 | Jeong ............................ 370/252 |
| 2009/0225705 | A1 * | 9/2009 | Kwon et al. .................. 370/329 |
| 2009/0296599 | A1 * | 12/2009 | Ayyagari et al. .............. 370/253 |

FOREIGN PATENT DOCUMENTS

| KR | 1020030047804 | 6/2003 |
| KR | 1020040001235 | 1/2004 |
| KR | 102006012164 | 11/2006 |

* cited by examiner

*Primary Examiner* — Kamran Afshar
*Assistant Examiner* — Khawar Iqbal
(74) *Attorney, Agent, or Firm* — The Farrell Law Firm, P.C.

(57) ABSTRACT

A system and method for providing a service in a communication system are provided, in which upon receipt of a request for provisioning of the service with a requested QoS class from an MS, a service server transmits a QoS information request message to an interface server and, upon receipt of a QoS information response message for the QoS information request message from the interface server, the service server provides the service with the requested QoS class to the MS.

7 Claims, 13 Drawing Sheets

SYSTEM AND METHOD FOR PROVIDING SERVICE IN A COMMUNICATION SYSTEM

PRIORITY

This application claims priority under 35 U.S.C. §119(a) to a Korean Patent Application filed in the Korean Intellectual Property Office on Sep. 30, 2006 and assigned Serial No. 2006-96691 and a Korean Patent Application filed in the Korean Intellectual Property Office on Apr. 27, 2007 and assigned Serial No. 2007-41641, the entire disclosure of both of which is hereby incorporated by reference.

BACKGROUND OF THE INVENTION

1. Field of the Invention

The present invention relates generally to a communication system. More particularly, the present invention relates to a system and method for providing a service in a communication system.

2. Description of the Related Art

In general, the development trend of communication systems is to provide a wireless packet data service beyond the traditional voice service. Thus, the communication systems provide services with a variety of Quality of Service (QoS) classes.

FIG. 1 illustrates the configuration of a typical communication system.

Referring to FIG. 1, the communication system includes an Internet service/content server 110, an Internet 120, a communication network 130, and a receiver 140 for receiving services from the Internet service/content server 110 and the communication network 130.

The Internet service/content server 110 is an application server for providing various Internet services/content. The Internet service/content server 110 includes an Internet Protocol TeleVision (IPTV) server 101 for providing an IPTV service, a music/video streaming server 102 for providing a music/video streaming service, a search server 103 for providing a search service, an advertising server 104 for providing an advertisement service, and an other-service server 105.

The communication network 130 has a Radio Access Station (RAS) (or Base Station (BS)) 111, an Access Service Network GateWay (ASN-GW) 112 for handling Medium Access Control (MAC) functions, a Core Service Network (CSN) 113 for handling connectivity to a network layer, a billing server 114, a QoS server 115, a user profile server 116, a device capability server 117, and a location information server 118.

The receiver 140 can be a Mobile Station (MS), a Personal Computer (PC), a Personal Digital Assistant (PDA), a Portable Multimedia Player (PMP), or a camera. For a more clear understanding, the following description is made in the context of the receiver 140 being an MS.

The Internet service/content server 110 is connected to the Internet 120 and provides a variety of content services to the MS 140 over the Internet 120, inclusive of the IPTV service, the music/video streaming service, the search service, the advertisement, and other services. That is, the Internet service/content server 110 is connected to the MS 140 at an IP address provided by the CSN 113 of the communication network 130 and provides content services to the MS 140 through the Internet 120.

FIG. 2 illustrates an operation for providing a service to an MS in an Internet service/content server in a communication system.

Referring to FIG. 2, it is assumed that the MS 140 receives an IPTV service from the Internet service/content server 110, for example, the IPTV server 101. Even though the MS 140 wants to receive an IPTV service with a desired QoS class, the IPTV server 101 provides the MS 140 with only a service with a QoS class supported by the communication network 130. In other words, an IPTV service is provided to the MS 140 not with the desired QoS class but with a QoS service class preset in the communication network 130. For example, the IPTV service takes the form of a best effort service.

As described above, when the MS is to receive a content service, for example, an IPTV service in the communication system, it cannot receive the content service with a desired QoS class.

SUMMARY OF THE INVENTION

An aspect of exemplary embodiments of the present invention is to address at least the problems and/or disadvantages described herein and to provide at least the advantages described below. Accordingly, an aspect of exemplary embodiments of the present invention is to provide a system and method for providing a service, taking into account a QoS class in a communication system.

Another aspect of exemplary embodiments of the present invention is to provide a system and method for providing a service using a QoS class-based billing regime.

In accordance with an aspect of exemplary embodiments of the present invention, there is provided a system for providing a service in a communication system, in which upon receipt from an MS of a request for a provisioning of a service with a requested QoS class, a service server transmits a QoS information request message to an interface server and, upon receipt from the interface server of a QoS information response message for the QoS information request message, the interface server provides the service with the requested QoS class to the MS.

In which the interface server receives from a service server information about a QoS class requested by an MS for the service, acquires information indicating support of the requested QoS class, and provides the QoS support information to the service server.

In accordance with still another aspect of exemplary embodiments of the present invention, there is provided a method for providing a service in a service server in a communication system, in which the service server transmits to an interface server a QoS information request message, upon receipt from an MS of a request for provisioning of the service with a requested QoS class, and provides to the MS the service with the requested QoS class, upon receipt from the interface server of a QoS information response message for the QoS information request message.

In accordance with still further aspect of exemplary embodiments of the present invention, there is provided a method for providing a service in an interface server in a communication system, in which the interface server receives from a service information about a QoS class requested by an MS for the service server, acquires information indicating support of the requested QoS class, and provides to the service server the QoS support information.

In accordance with yet still another aspect of exemplary embodiments of the present invention, there is provided a method for providing a service in a service server in a communication system, in which the service server receives from an MS over an access network to which the MS is connected a request for requesting the service, identifies the access network of the MS, determines a QoS class supported over the access network, and notifies the MS of the supported QoS class.

In accordance with yet still further aspect of exemplary embodiments of the present invention, there is provided a system for providing a service in a communication system, in which a service server receives from an MS over an access network to which the MS is connected a request for requesting the service, identifies the access network of the MS, determines a QoS class supported over the access network, and notifies the MS of the supported QoS class, and the MS receives from the service server the service with the supported QoS class.

BRIEF DESCRIPTION OF THE DRAWINGS

The above and other objects, features and advantages of certain exemplary embodiments of the present invention will be more apparent from the following detailed description taken in conjunction with the accompanying drawings, in which.

DETAILED DESCRIPTION OF EXEMPLARY EMBODIMENTS

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention provide a system and method for providing the service with a QoS class requested by the MS in a communication system when an MS wants to receive a service from an Internet service/content server.

While it is described herein that the MS receives an IPTV service from the Internet service/content server, it is also contemplated that the same description applies to a location information service, an advertisement service, a user information service, etc.

Figure 1:
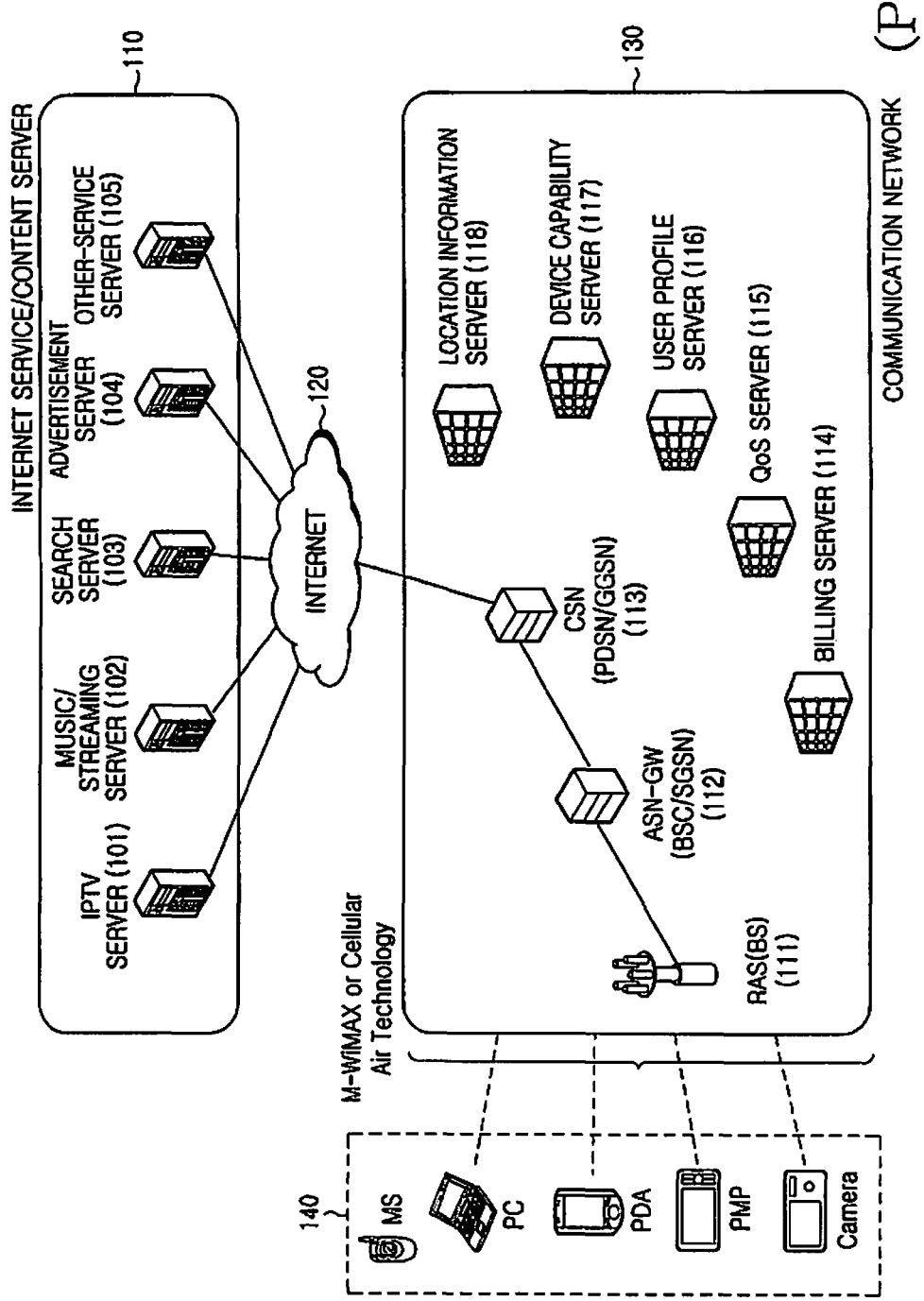
FIG. 1 illustrates a typical communication system.
Figure 2:
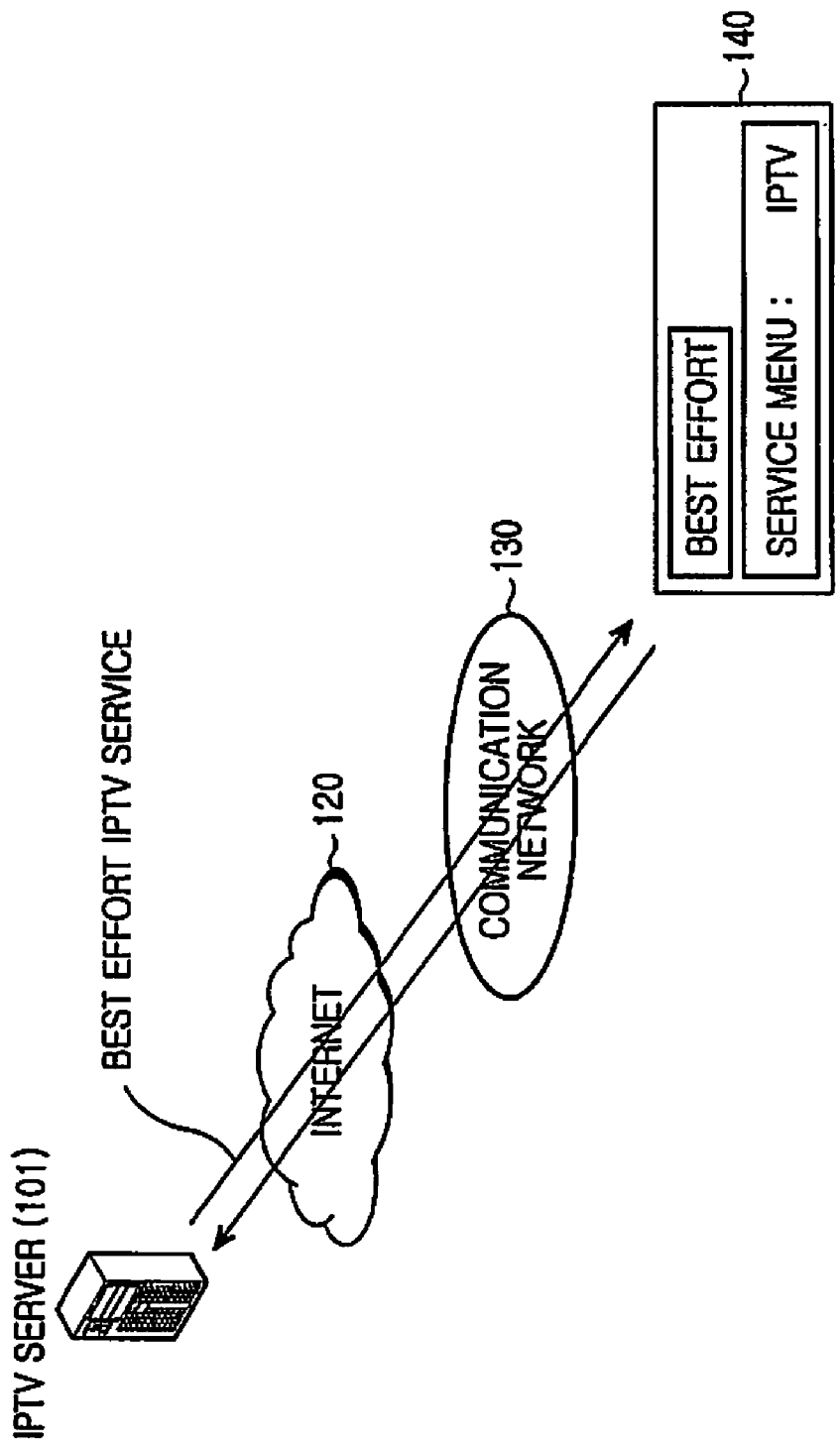
FIG. 2 illustrates an operation for providing a service to an MS in an Internet service/content server in the typical communication system.
Figure 3:
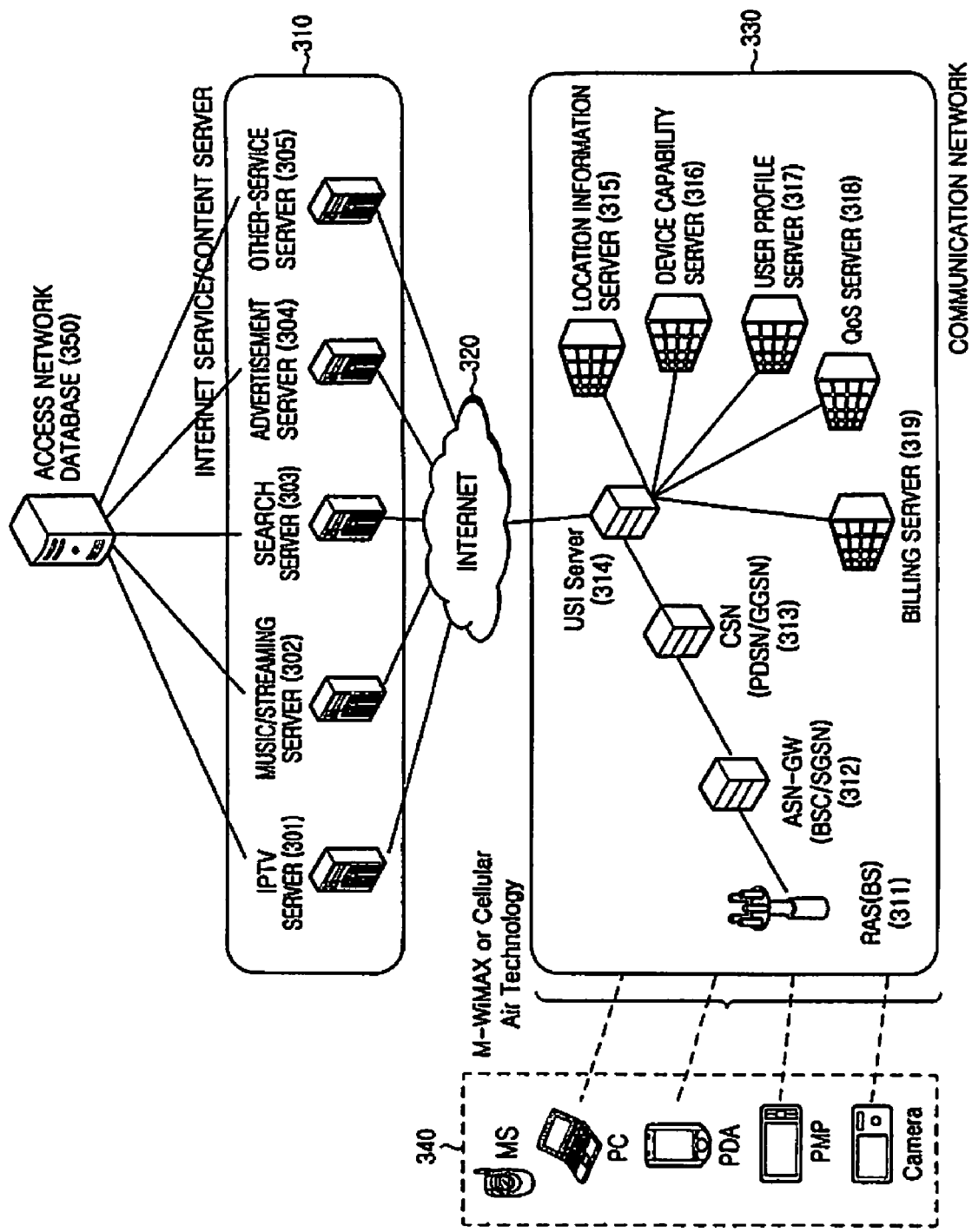
FIG. 3 illustrates a communication system according to an exemplary embodiment of the present invention.

FIG. 3 illustrates a communication system according to an exemplary embodiment of the present invention.

Referring to FIG. 3, the communication system includes an Internet service/content server 310, an Internet 320, a communication network 330, a receiver 340 for receiving services from the Internet service/content server 310 and the communication network 330, and an access network database 350.

The Internet service/content server 310 is an application server for providing various Internet services/content. It includes an IPTV server 301 for providing an IPTV service, a music/video streaming server 302 for providing a music/video streaming service, a search server 303 for providing a search service, an advertising server 304 for providing an advertisement service, and an other-service server 305 for providing other content services.

The communication network 330 has a RAS (or BS) 311, an ASN-GW 312 for handling MAC functions, a CSN 313 for handling connectivity to a network layer, a Universal Service Interface (USI) server 314, a location information server 315, a device capability server 316, a user profile server 317, a QoS server 318, and a billing server 319.

The receiver 340 can be an MS, a PC, a PDA, a PMP, or a camera. For a clear understanding of the present invention, the following description is made in the context of the receiver 340 being an MS.

The Internet service/content server 310 is connected to the Internet 320 and provides a variety of content services to the MS 340 over the Internet 320, inclusive of an IPTV service, a music/video streaming service, a search service, an advertisement, and other services. The Internet service/content server 310 is connected to the MS 340 at an IP address provided by the CSN 313 of the communication network 330 and provides content services to the MS 340 through the Internet 320.

The USI server 314 residing in the communication network 330 interfaces with the location information server 315, the device capability server 316, the user profile server 317, the QoS server 318, and the billing server 319. The USI server 314 may incorporate the location information server 315, the device capability server 316, the user profile server 317, the QoS server 318, and the billing server 319.

The MS 340 requests an IPTV service to the Internet service/content server 310. Upon receipt of the IPTV service request, the Internet service/content server 310 checks an access network to which the MS 340 is connected through the access network database 350. To be more specific, the Internet service/content server 310 determines if the USI server 314 can support the access network of the MS 340. If the USI server 314 can support the access network of the MS 340, that is, if the Internet service/content server 310 can provide the requested IPTV service to the MS 340 through the USI server 314, the Internet service/content server 310 checks a QoS class of the IPTV service supported by the QoS server 318 through the USI server 314.

The Internet service/content server 310 notifies the MS 340 of the supported QoS class of the IPTV service that can be provided over the access network of the MS 340.

If it is not possible to provide the IPTV service to the MS 340 through the USI server 314, that is, if the USI server 314 cannot support the access network of the MS 340, the Internet service/content server 310 notifies the MS 340 of the provisioning of the IPTV service without support from the QoS server 318, for example, with QoS class 1.

If it is possible to provide the IPTV service to the MS 340 through the USI server 314, the Internet service/content server 310 notifies the MS 340 that the IPTV service can be provided with support from the QoS server 318, for example, with QoS class 2, through the USI server 314. In this case, the Internet service/content server 310 can additionally notify the MS 340 that the IPTV service can be provided with QoS class 1.

Upon notification of the QoS class, for example, upon notification of QoS class 1 or one of the QoS class 1 and QoS class 2 depending on whether the IPTV service is supported by the QoS server 318 through the USI server, the MS 340 receives the IPTV service with QoS class 1 or with a selected one of QoS class 1 and QoS class 2.

Figure 4:
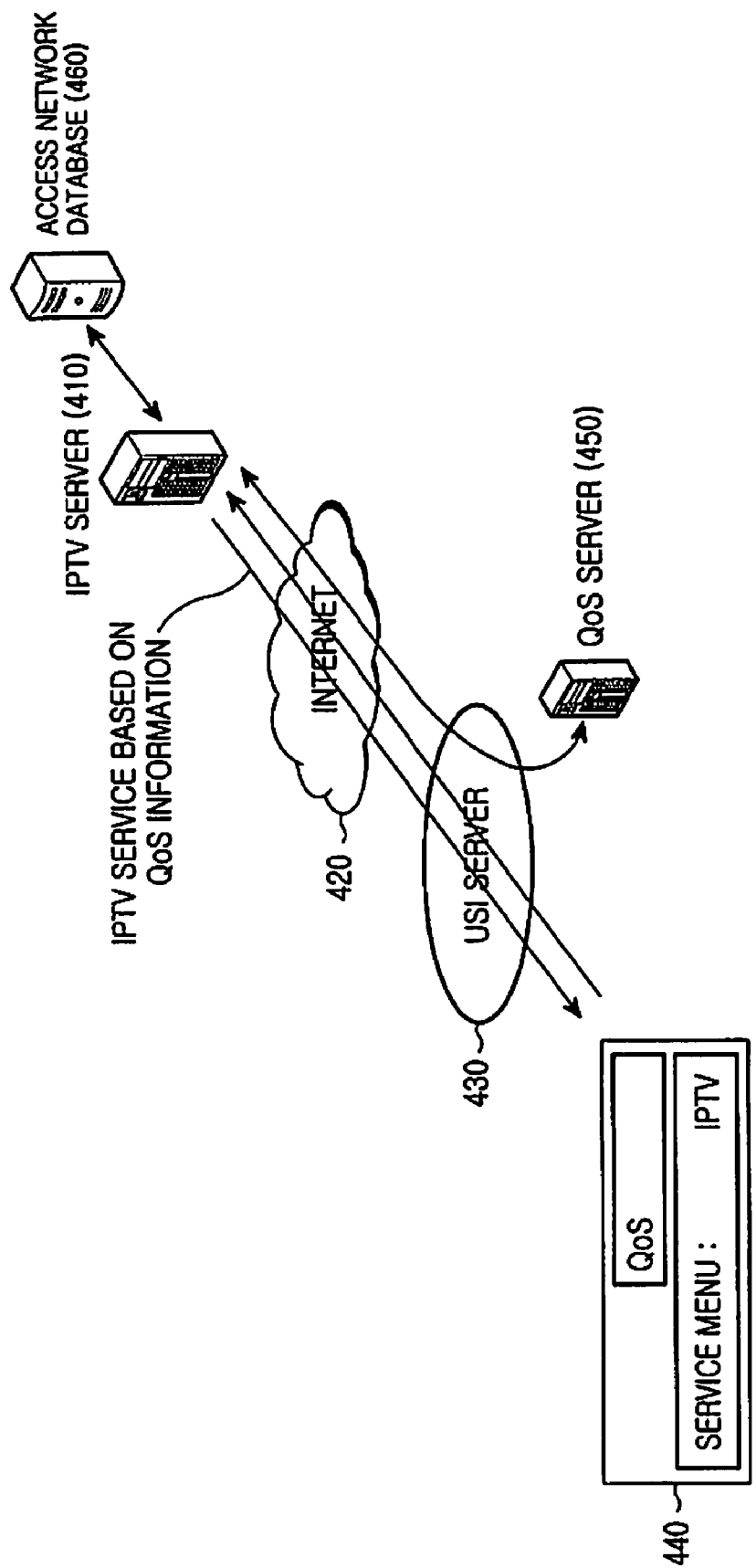
FIG. 4 illustrates an operation for providing a service to an MS in an Internet service/content server in the communication system according to an exemplary embodiment of the present invention.

FIG. 4 illustrates an operation for providing a service to an MS in an Internet service/content server in the communication system according to an exemplary embodiment of the present invention.

Referring to FIG. 4, the communication system includes an Internet service/content server, for example, an IPTV server 410, an Internet 420 over which an MS 440 is connected to the IPTV server 410, a USI server 430 for connecting a QoS server 450 to the IPTV server 410, and an access network database 460.

The MS 440 sends a request for an IPTV service from the IPTV server 410. Upon receipt of the IPTV service request, the IPTV server 410 determines through the access network database 460 if the USI server 430 can support an access network to which the MS 440 is connected. To be more specific, the IPTV server 410 if whether the access network of the MS 440 is supportable by the USI server 430 by comparing an IP address of the access network of the MS 440 with IP addresses stored in the access network database 460. The IPTV server 410 notifies the MS 440 of the determination result. If the IPTV service can be provided with support of the QoS server 450, the IPTV server 410 notifies the MS 440 that the IP service can be provided with QoS class 2 or with QoS class 1. If the IPTV service is to be provided without support of the QoS server 450, the IPTV server 410 notifies the MS 440 that the IP service is provided with QoS class 1.

In the former case, the MS 440 selects a desired QoS class, for example, one of QoS class 1 and QoS class 2, and receives the IPTV service with the selected QoS class, whereas in the latter case, the MS 440 receives the IPTV service with QoS class 1.

Figure 5:
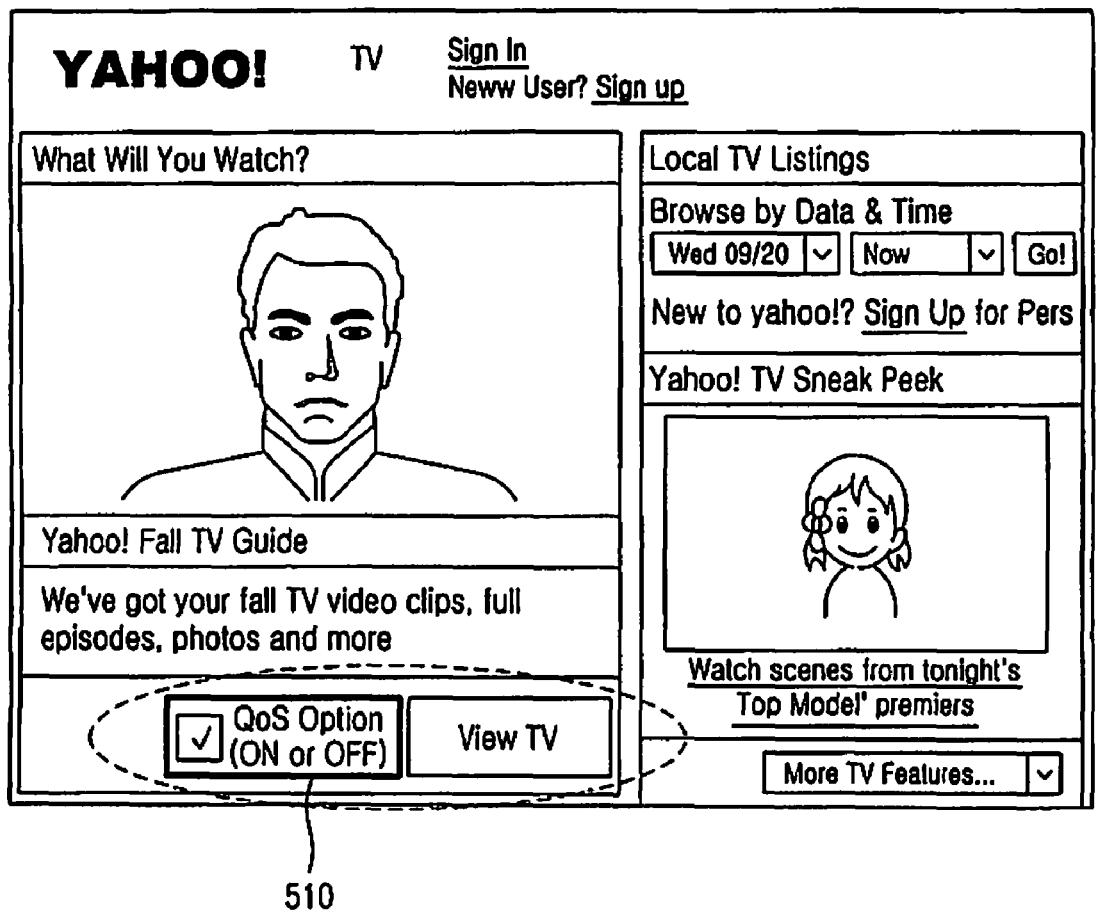
FIG. 5 illustrates a page displayed when the MS accesses an IPTV server in the communication system according to an exemplary embodiment of the present invention.

FIG. 5 illustrates a page displayed when the MS accesses the IPTV server in the communication system according to an exemplary embodiment of the present invention.

Referring to FIG. 5, in the case where the USI server supports the access network to which the MS is connected, the MS receives available QoS class information for the IPTV service from the IPTV server over the access network.

Then, when the MS selects a QoS option 510, the MS receives the IPTV service with high resolution, that is, with QoS class 2. If the MS does not select the QoS option 510, it receives the IPTV service with standard resolution, that is, with QoS class 1.

Figure 6:
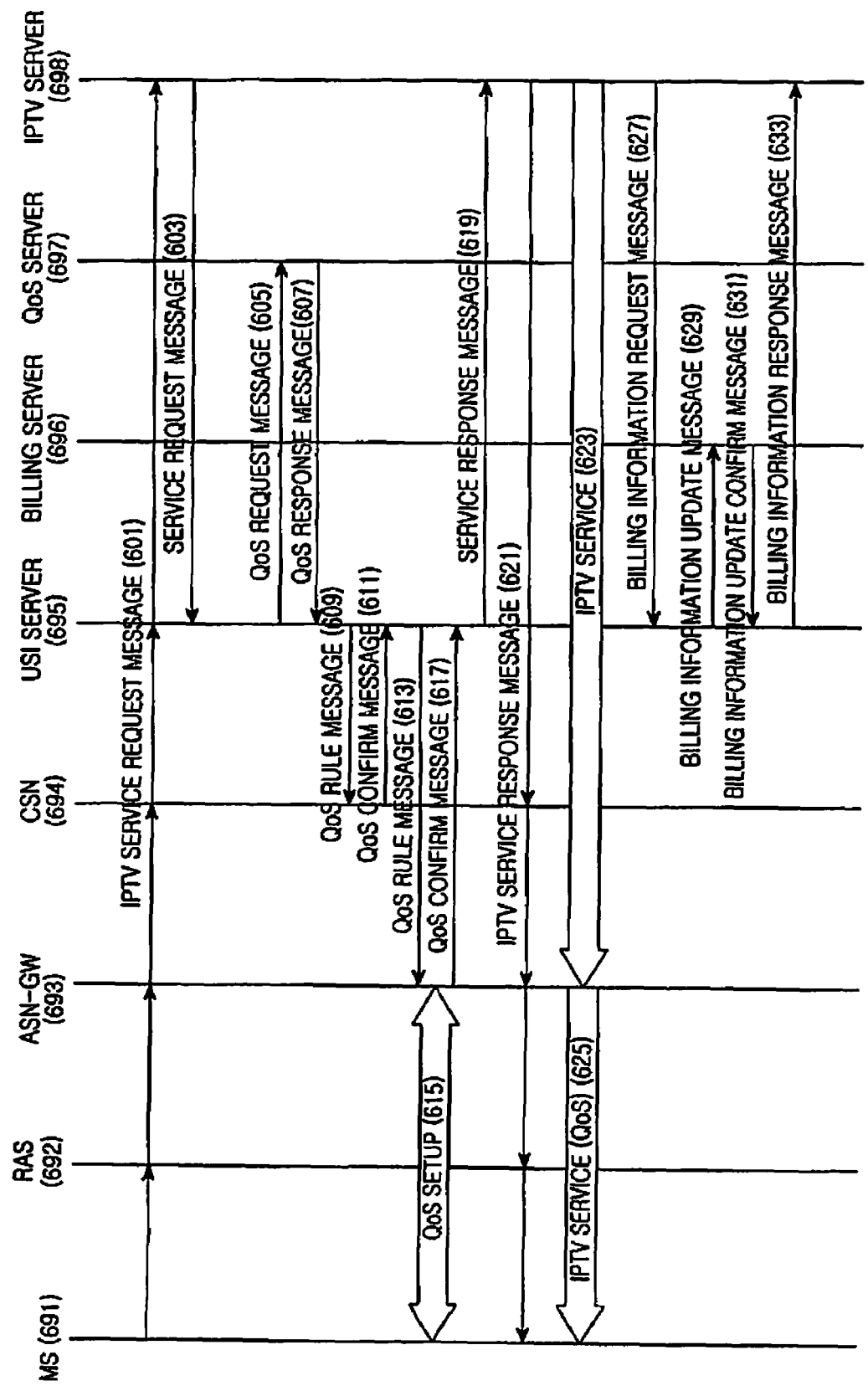
FIG. 6 is a signal flow diagram for a process of receiving an IPTV service at the MS from the IPTV server in the communication system according to an exemplary embodiment of the present invention.

FIG. 6 is a diagram illustrating a signal flow for a process of receiving the IPTV service at the MS from the IPTV server in the communication system according to an exemplary embodiment of the present invention.

Referring to FIG. 6, the communication system includes an MS 691, a RAS 692, an ASN-GW 693, a CSN 694, a USI server 695, a billing server 696, a QoS server 697, and an IPTV server 698.

In step 601, the MS 691 transmits an IPTV service request message to the IPTV server 698 in order to receive an IPTV service with a desired QoS class. The IPTV service request message includes user IP information, port information, and requested QoS class information. The IPTV service request message passes through the RAS 692, the ASN-GW 693, and the CSN 694.

In order to provide the MS 691 with the IPTV service at the requested QoS class, in step 603 the IPTV server 698 transmits to the USI server 695 a service request message with the requested QoS class information, the user IP information, server IP information, the user port information, server port information, and protocol information.

In step 605, the USI server 695 transmits a QoS request message to the QoS server 697 to request the QoS class.

The QoS server 697 determines if it can support the requested QoS class. If the QoS class server 697 can support the requested QoS class, in step 607 the QoS class server 697 replies to the USI server 695 with a QoS response message including a parameter indicating support of the requested QoS class.

The USI server 695 transmits in step 609 a QoS rule message including the user IP information, user port information, server IP information, and server port information to the CSN 694. The QoS rule message prompts the CSN 694 to set a rule for the requested QoS class. Rule setting relates to determining a desired valid period of the requested QoS class, a desired amount of traffic (e.g. 1 GB or 10 GB), a desired resolution, a desired bit rate, etc. When completing the QoS rule setting, the CSN 694 transmits in step 611 a QoS confirm message to the USI server 695.

The USI server 695 is aware that the QoS rule is also to be set in the access network and thus in step 613 transmits a QoS rule message including information about the QoS rule to the ASN-GW 693. The ASN-GW 693 in step 615 sets up the requested QoS between the MS 691 and the ASN-GW 693. Upon completion of the setup, the ASN-GW 693 transmits in step 617 a QoS confirm message indicating the completed QoS rule setting to the USI server 695.

While not shown, the CSN 694 may perform steps 613 and 617. The QoS server 697 may perform steps 609, 611, 613, and 617. It is also possible that the QoS server 697 performs steps 609 and 611 and the CSN 694 performs steps 613 and 617. Other combinations are also contemplated.

In step 619, the USI server 695 transmits a service response message including the QoS rule for the service request message to the IPTV server 698.

The IPTV server 698 transmits in step 621 an IPTV service response message with QoS information, server IP information, server port information, and protocol information to the MS 691. The IPTV service response message is transmitted to the MS 691 via the CSN 694, the ASN-GW 693, and the RAS

692. Thus, the MS 691 receives in steps 623 and 625 the IPTV service with the desired QoS class from the IPTV server 698.

The IPTV server 698 transmits in step 627 a billing information request message to the USI server 695. The USI server 695 transmits in step 629 a billing information update message to the billing server 696, for calculating the charge of the IPTV service with the requested QoS class.

In step 631, the billing server 696 updates billing information for the MS 691 in relation to the IPTV service with the requested QoS class and transmits a billing information update confirm message to the USI server 695.

In fact, steps 629 and 631 are performed for the USI server 695 to respond to the IPTV server 698 for the billing information request message. Then, the USI server 695 transmits in step 633 a billing information response information message to the IPTV server 698.

The billing information update can be carried out through the USI server 695 in steps 629 and 631 without steps 627 and 633. Also, the billing information update of steps 627 to 633 may precede the IPTV service provisioning of steps 623 and 625. For ensuring security, the service request message and the service response message can be transmitted in steps 603 and 619 by Hyper Text Transfer Protocol (HTTP).

Figure 7:
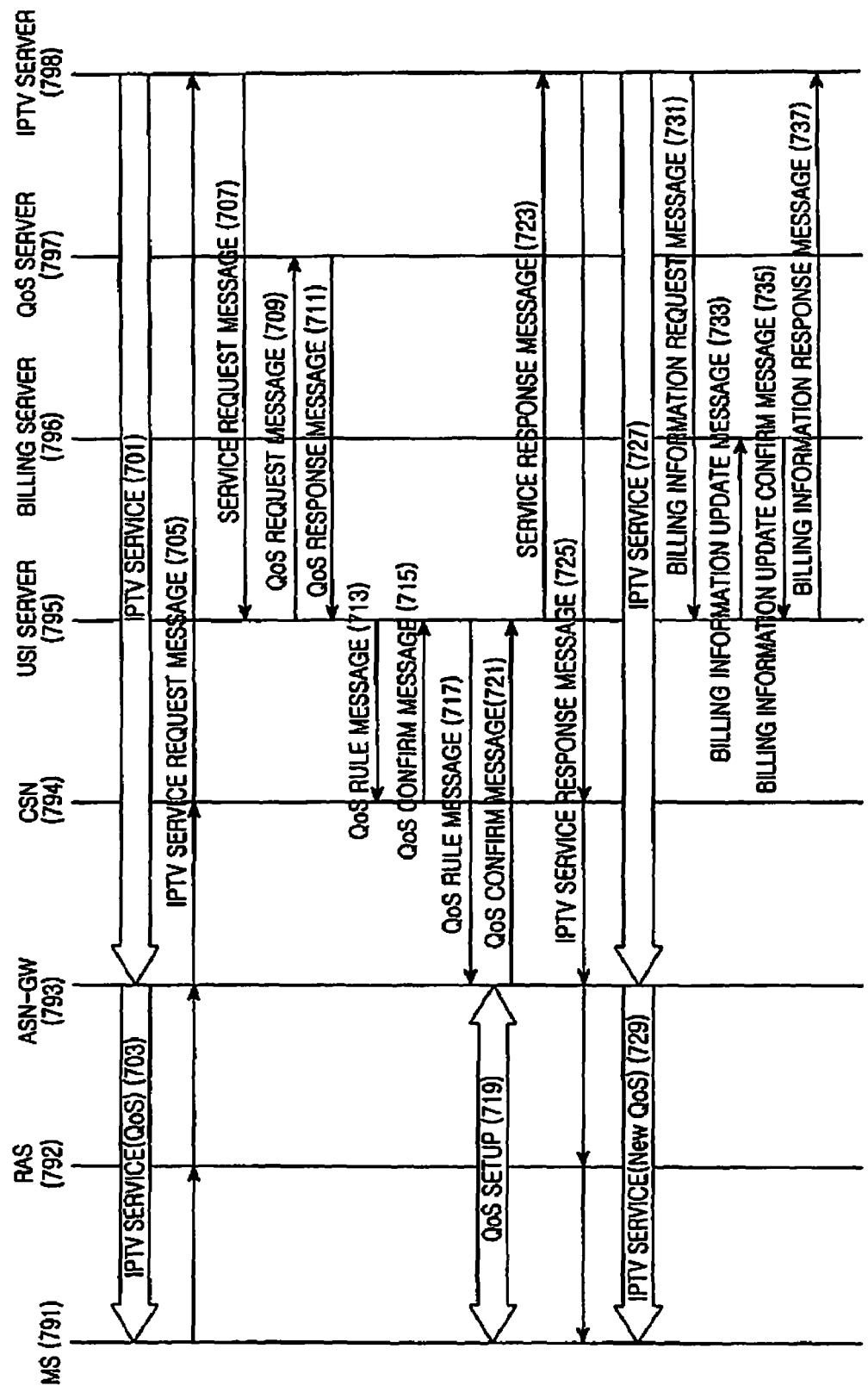
FIG. 7 is a signal flow diagram for a process of requesting a QoS change by the MS in the communication system according to an exemplary embodiment of the present invention.

FIG. 7 is a diagram illustrating a signal flow for a process of requesting a QoS change by the MS in the communication system according to an exemplary embodiment of the present invention.

Referring to FIG. 7, the communication system includes an MS 791, a RAS 792, an ASN-GW 793, a CSN 794, a USI server 795, a billing server 796, a QoS server 797, and an IPTV server 798.

The MS 791 is receiving in steps 701 and 703 an IPTV service with a QoS class requested by the MS 791 from the IPTV server 798. To receive the IPTV service with a different QoS class, the MS 791 transmits in step 705 an IPTV service request message to the IPTV server 798. The IPTV service request message includes user IP information, port information, and new requested QoS class information. The IPTV service request message passes through the RAS 792, the ASN-GW 793, and the CSN 794.

In order to provide the IPTV service with the new requested QoS class to the MS 791, the IPTV server 798 transmits in step 707 to the USI server 795 a service request message with the new requested QoS class information, the user IP information, server IP information, the user port information, server port information and protocol information.

In step 709, the USI server 795 transmits a QoS request message to the QoS server 797 to request the new QoS class.

The QoS server 797 determines if it can support the new requested QoS class. If it can support the new requested QoS class, the QoS server 797 replies in step 711 to the USI server 795 with a QoS response message including a parameter indicating support of the new requested QoS class.

The USI server 795 transmits in step 713 a QoS rule message including the user IP information, user port information, server IP information, and server port information to the CSN 794. The QoS rule message prompts the CSN 794 to set a rule for the new requested QoS class. Rule setting relates to determining a desired valid period for the requested QoS class, a desired amount of traffic (e.g. 1 GB or 10 GB), a desired resolution, a desired bit rate, etc. Upon completion of the QoS rule setting, the CSN 794 transmits in step 715 a QoS confirm message to the USI server 795.

The USI server 795 is aware that the QoS rule is also to be set in the access network and thus transmits in step 717 a QoS rule message including information about the QoS rule to the ASN-GW 793. The ASN-GW 793 sets up in step 719 the new requested QoS between the MS 791 and the ASN-GW 793. Upon completion of the setup, the ASN-GW 793 transmits in step 721 a QoS confirm message indicating the completed QoS rule setting to the USI server 795.

While not shown, the CSN 794 may perform steps 717 and 721 and the QoS server 797 may perform steps 713, 715, 717, and 721. It is also possible that the QoS server 797 performs steps 713 and 715 and the CSN 794 performs steps 717 and 721. Other variations are also contemplated.

In step 723, the USI server 795 transmits a service response message including the new QoS rule for the service request message to the IPTV server 798 to provide the IPTV service with the new requested QoS class.

The IPTV server 798 transmits in step 725 an IPTV service response message with QoS information, server IP information, server port information, and protocol information to the MS 791. The IPTV service response message is transmitted to the MS 791 via the CSN 794, the ASN-GW 793, and the RAS 792. Thus, a channel is established between the IPTV server 798 and the MS 791 and the MS 791 receives in steps 727 and 729 the IPTV service with the new requested QoS class from the IPTV server 798.

The IPTV server 798 transmits in step 731 a billing information request message to the USI server 795. The USI server 795 transmits in step 733 a billing information update message to the billing server 796, for calculating the charge of the IPTV service with the new requested QoS class.

In step 735, the billing server 796 updates billing information for the MS 791 in relation to the IPTV service with the new requested QoS class and transmits a billing information update confirm message to the USI server 795.

In fact, steps 733 and 735 are performed for the USI server 795 to respond to the IPTV server 798 for the billing information request message. The USI server 795 transmits in step 737 a billing information response information message to the IPTV server 798.

The billing information update can be carried out through the USI server 795 in steps 733 and 735 without steps 731 and 737. Also, the billing information update of steps 731 to 737 may precede the IPTV service provisioning of steps 727 and 729. For ensuring security, the service request message and the service response message can be transmitted in steps 707 and 723 by HTTP.

Figure 8:
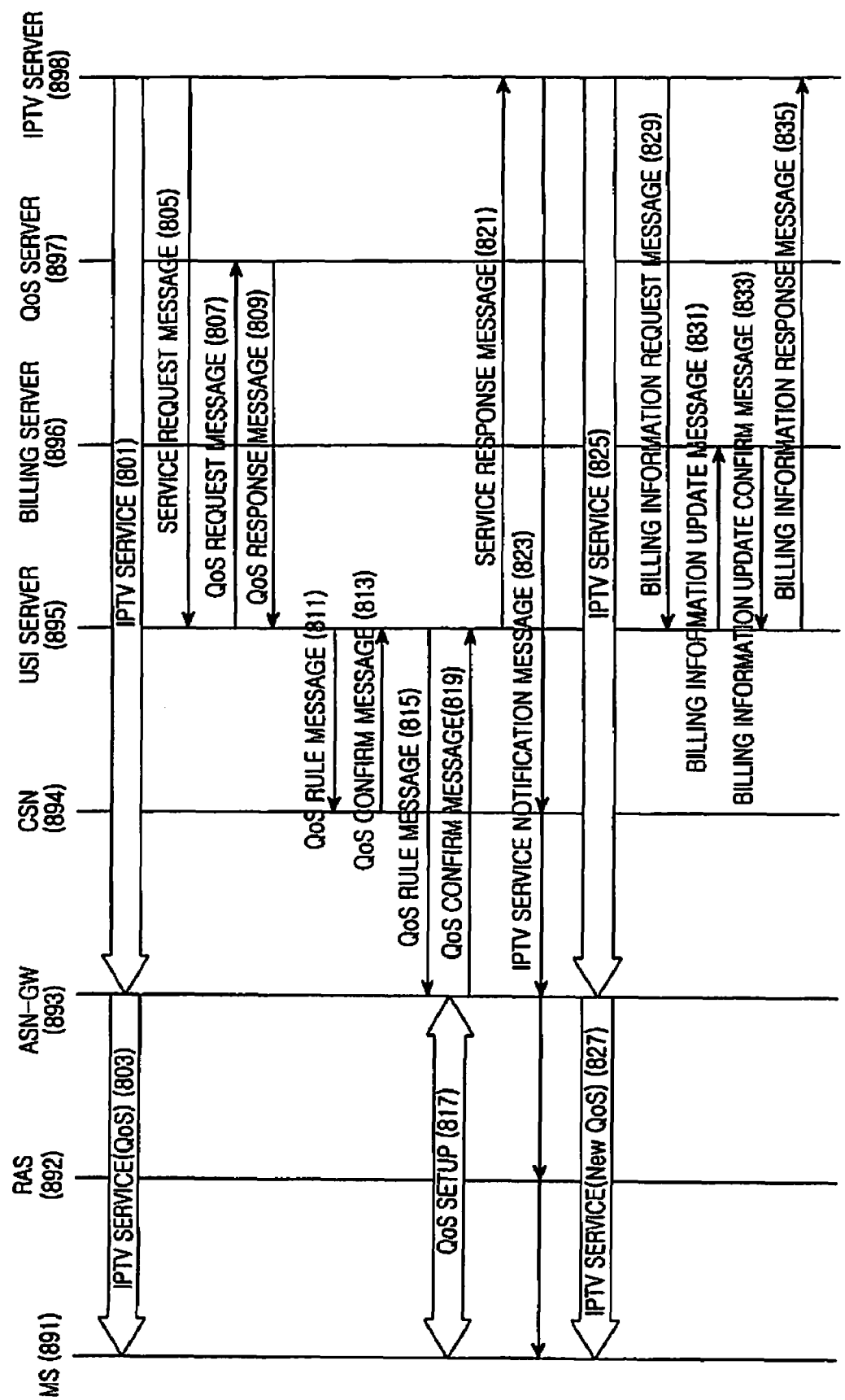
FIG. 8 is a signal flow diagram for a process of requesting a QoS change by the IPTV server in the communication system according to an exemplary embodiment of the present invention.

FIG. 8 is a diagram illustrating a signal flow for a process of requesting a QoS change by the IPTV server in the communication system according to an exemplary embodiment of the present invention.

Referring to FIG. 8, the communication system includes an MS 891, a RAS 892, an ASN-GW 893, a CSN 894, a USI server 895, a billing server 896, a QoS server 897, and an IPTV server 898.

The MS 891 is receiving in steps 801 and 803 an IPTV service with a QoS class requested by the MS 891 from the IPTV server 898. To change the current QoS class of the IPTV service, the IPTV server 898 transmits in step 805 an IPTV service request message to the USI server 895. The IPTV service request message includes new requested QoS class information, user IP information, user port information, server IP information, server port information, and protocol information. The IPTV service request message is transmitted to the USI server 895 to provide the IPTV service with a new QoS class to the MS 891.

Steps 807 to 821 are performed in the same manner as steps 709 to 723 illustrated in FIG. 7 and their detailed description is not provided herein.

The IPTV server 898 transmits in step 823 an IPTV service notification message with new QoS class information, server IP information, server port information, and protocol information to the MS 891. The IPTV service notification message is transmitted to the MS 891 via the CSN 894, the ASN-GW 893, and the RAS 892. A channel is established between the IPTV server 898 and the MS 891 and the MS 891 receives in steps 825 and 827 the IPTV service with the new QoS class from the IPTV server 898.

Steps 829 to 835 are identical to steps 731 to 737 illustrated in FIG. 7 and thus will not be described herein.

Figure 9:
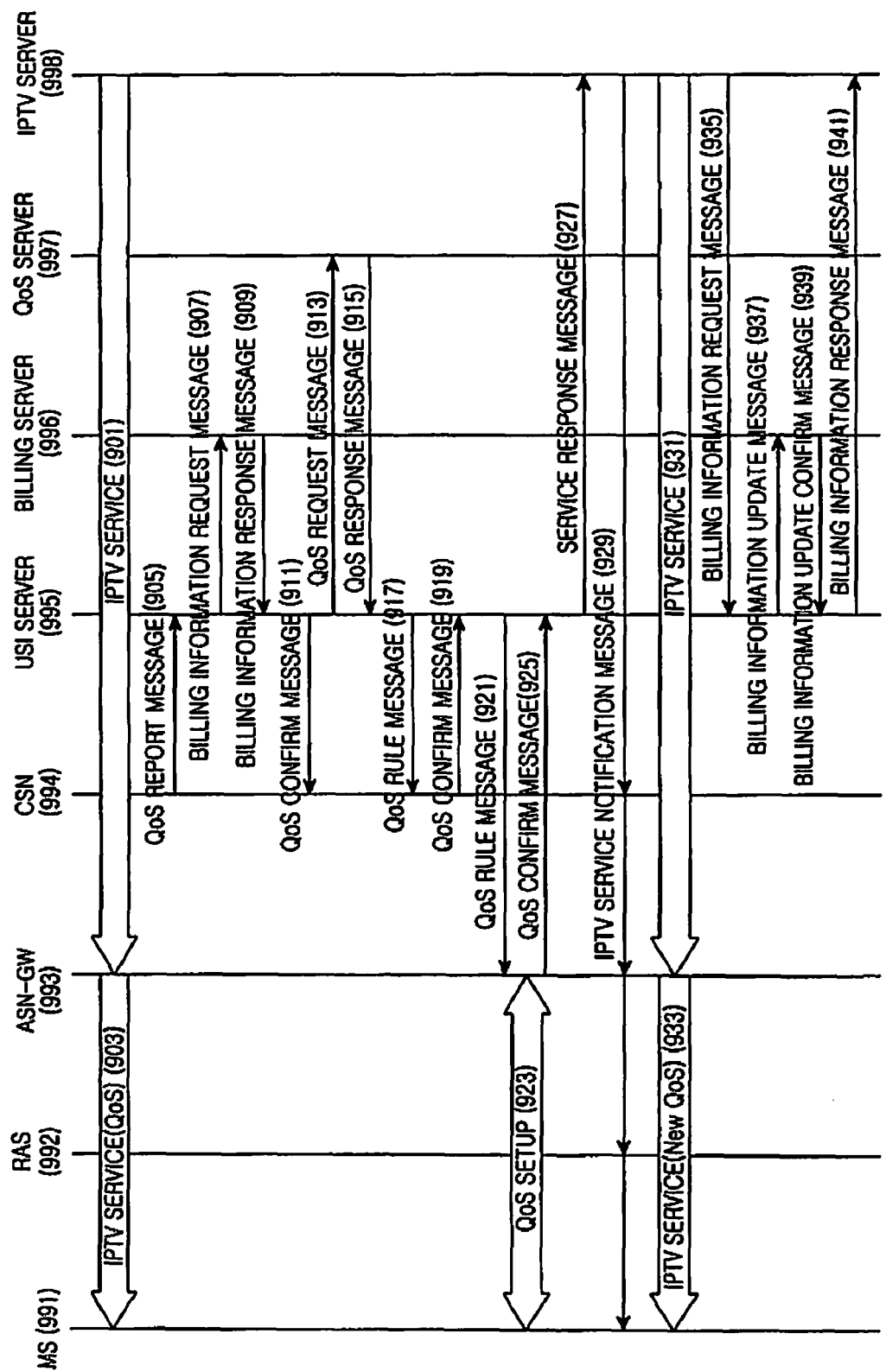
FIG. 9 is a signal flow diagram for a process of requesting a QoS change by a Universal Service Interface (USI) server in the communication system according to an exemplary embodiment of the present invention.

FIG. 9 is a diagram illustrating a signal flow for a process of requesting a QoS class change by the USI server in the communication system according to an exemplary embodiment of the present invention. When the valid period of a current QoS class has expired or an allocated traffic amount has been exceeded, the USI server can request a QoS class change.

Referring to FIG. 9, the communication system includes an MS 991, a RAS 992, an ASN-GW 993, a CSN 994, a USI server 995, a billing server 996, a QoS server 997, and an IPTV server 998.

The MS 991 is receiving in steps 901 and 903 an IPTV service with a QoS class requested by the MS 991 from the IPTV server 998. When the valid period of the QoS class has expired or an allocated traffic amount has been exceeded, the CSN 994 transmits in step 905 a QoS report message to the USI server 995, notifying that the on-going IPTV service of the QoS class cannot be further supported for the MS 991.

In step 907, the USI server 995 transmits a billing information request message requesting billing information about the IPTV service provided so far to the billing server 996. The billing server 996 calculates the charge of the IPTV service of the QoS class provided so far to the MS 991 and transmits in step 909 a billing information response message to the USI server 995 according to the charge.

The USI server 995 transmits in step 911 to the USI server 994 a QoS confirm message confirming the QoS class of the IPTV service provided to the MS 991 by the IPTV server 998.

In step 913, the USI server 995 transmits a QoS request message requesting a new QoS class to the QoS server 997. The QoS server 997 transmits in step 915 to the USI server 995 with a QoS response message. If the QoS server 997 cannot support the IPTV service, the QoS response message may include information indicating that the initially requested QoS class, for example, QoS class 2 is deleted and the IPTV service will be provided in the form of a best effort service, for example, with QoS class 1. If the QoS server 997 supports the IPTV service with the new QoS class, the QoS response message may include information commanding the USI server 995 to request the new QoS class.

The USI server 995 transmits in step 917 a QoS rule message with the QoS request result, the user IP information, user port information, server IP information, and server port information to the CSN 994.

Steps 919 to 941 are identical to steps 807 to 835 illustrated in FIG. 8 and thus will not be described herein.

Figure 10:
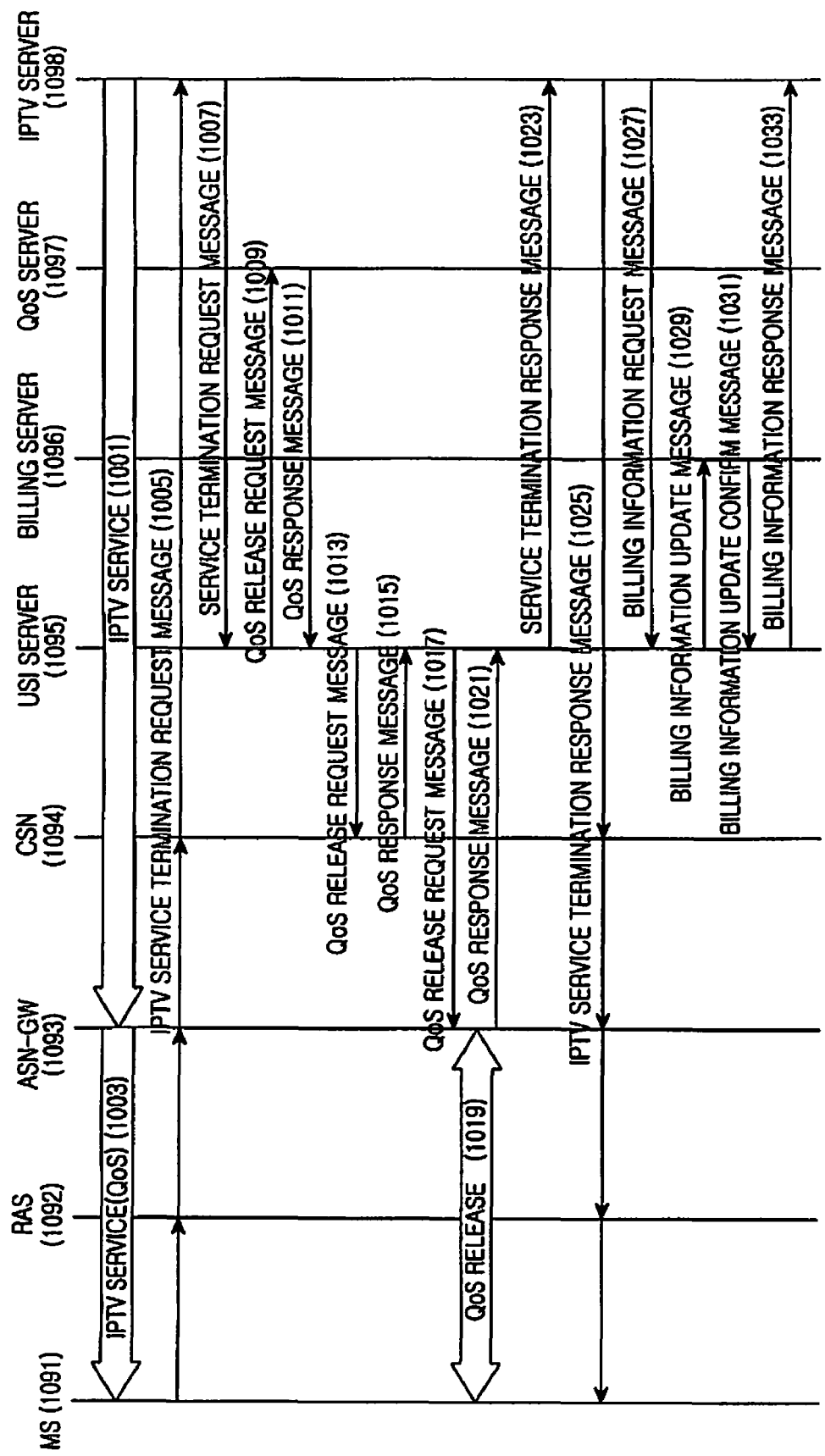
FIG. 10 is a signal flow diagram for a process of requesting termination of the IP service by the MS in the communication system according to an exemplary embodiment of the present invention.

FIG. 10 is a diagram illustrating a signal flow for a process of requesting termination of the IP service by the MS in the communication system according to an exemplary embodiment of the present invention.

Referring to FIG. 10, the communication system includes an MS 1091, a RAS 1092, an ASN-GW 1093, a CSN 1094, a USI server 1095, a billing server 1096, a QoS server 1097, and an IPTV server 1098.

The MS 1091 is receiving in steps 1001 and 1003 an IPTV service with a QoS class requested by the MS 1091 from the IPTV server 1098. If the MS 1091 is to terminate the on-going IPTV service, the MS 1091 transmits in step 1005 an IPTV service termination request message to the IPTV server 1098. The IPTV service termination request message includes user IP information, port information, and QoS class information. The IPTV service termination request message passes through the RAS 1092, the ASN-GW 1093, and the CSN 1094.

The IPTV server 1098 transmits in step 1007 a service termination request message to the USI server 1095, requesting termination of the IPTV service and QoS release.

The USI server 1095 transmits a QoS release request message to the QoS server 1097 in step 1009 and the QoS server 1097 transmits a QoS response message to the USI server 1095 in step 1011.

The USI server 1095 transmits a QoS release request message to the CSN 1094 in step 1013. The CSN 1094 deletes a QoS policy in relation to the QoS release and transmits in step 1015 a QoS response message associated with the QoS information deletion to the USI server 1095. The QoS response message includes billing information such as a QoS duration time or the amount of transmission traffic. The USI server 1095 transmits in step 1017 a QoS release request message to the ASN-GW 1093. The ASN-GW 1093 performs in step 1019 the QoS release with the MS 1091. Upon completion of the QoS release, the ASN-GW 1093 transmits in step 1021 a QoS response message including a QoS release result to the USI server 1095.

The CSN 1094 may perform steps 1013 and 1015. The QoS server 1097 may perform steps 1013, 1015, 1017, and 1021. It is also possible that the QoS server 1097 performs steps 1013 and 1015 and the CSN 1094 performs steps 1017 and 1021. Other variations are contemplated.

In step 1023, the USI server 1095 transmits a service termination response message for the service termination request message to the IPTV server 1098. The IPTV server 1098 transmits in step 1025 an IPTV service termination response message indicating the completed termination of the IPTV service to the MS 1091. The IPTV service termination response message is transmitted to the MS 1091 via the CSN 1094, the ASN-GW 1093, and the RAS 1092.

The IPTV server 1098 transmits in step 1027 a billing information request message to the USI server 1095. The USI server 1095 transmits in step 1029 a billing information update message to the billing server 1096, for calculating the charge of the IPTV service with the QoS class.

In step 1031, the billing server 1096 updates billing information about the IPTV service with the QoS class and transmits a billing information update confirm message to the USI server 1095.

In fact, steps 1029 and 1031 are performed for the USI server 1095 to respond to the IPTV server 1098 for the billing information request message. Thus, the USI server 1095 transmits in step 1033 a billing information response message to the IPTV server 1098.

The billing information update can be carried out through the USI server 1095 in steps 1029 and 1031 without steps 1027 and 1033. Also, the billing information update of steps 1027 to 1033 may precede the IPTV service termination of step 1025.

Figure 11:
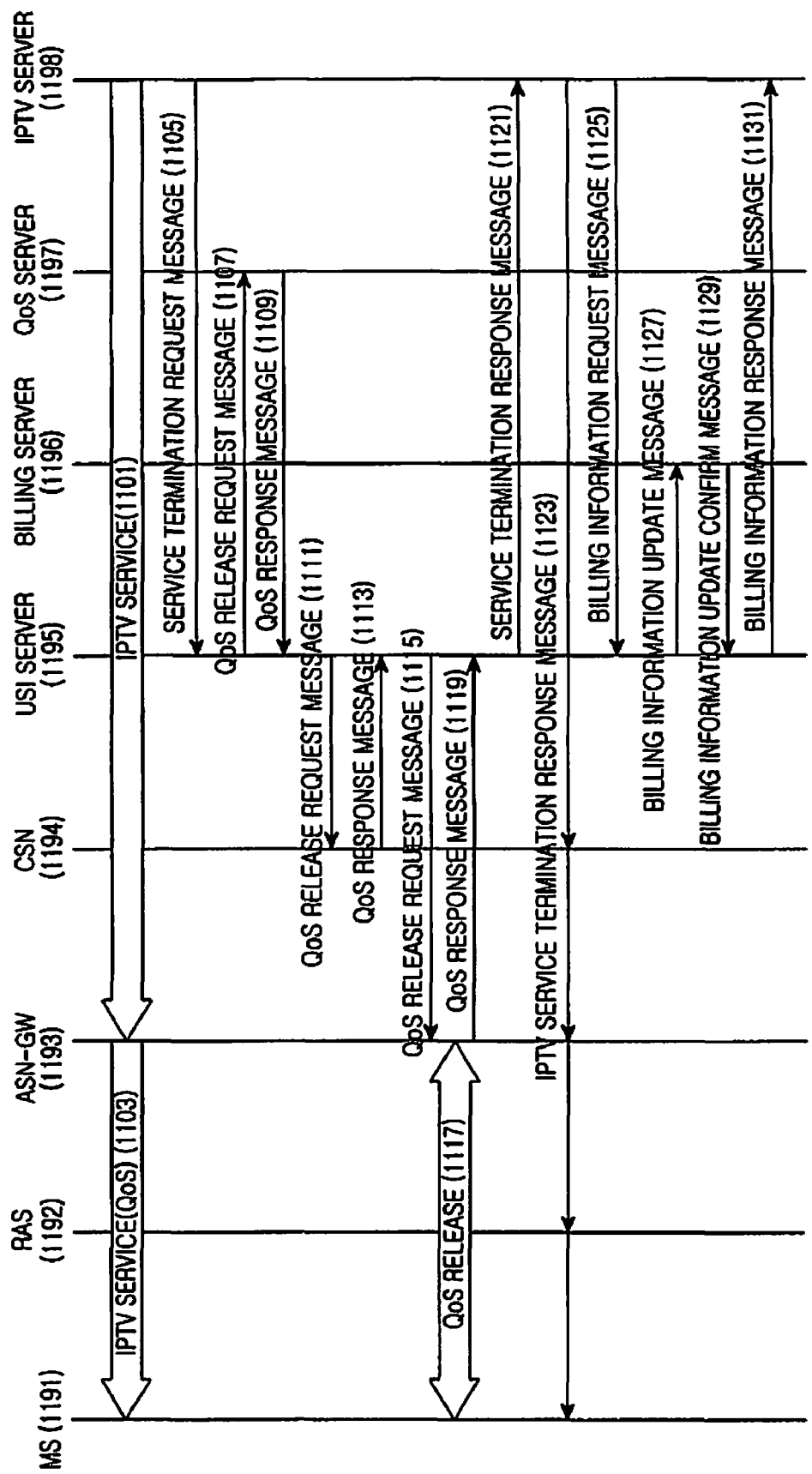
FIG. 11 is a signal flow diagram for a process of terminating the IP service by the IP server in the communication system according to an exemplary embodiment of the present invention.

FIG. 11 is a diagram illustrating a signal flow for a process of terminating the IP service by the IP server in the communication system according to an exemplary embodiment of the present invention.

Referring to FIG. 11, the communication system includes an MS 1191, a RAS 1192, an ASN-GW 1193, a CSN 1194, a USI server 1195, a billing server 1196, a QoS server 1197, and an IPTV server 1198.

The MS 1191 is receiving in steps 1101 and 1103 an IPTV service with a QoS class requested by the MS 1191 from the IPTV server 1198. To terminate the on-going IPTV service, the IPTV server 1198 transmits in step 1105 a service termination request message to the USI server 1195, requesting termination of the IPTV service and QoS release simultaneously.

Steps 1107 to 1131 are identical to steps 1009 to 1033 illustrated in FIG. 10 and thus will not be described in detail herein.

Figure 12:
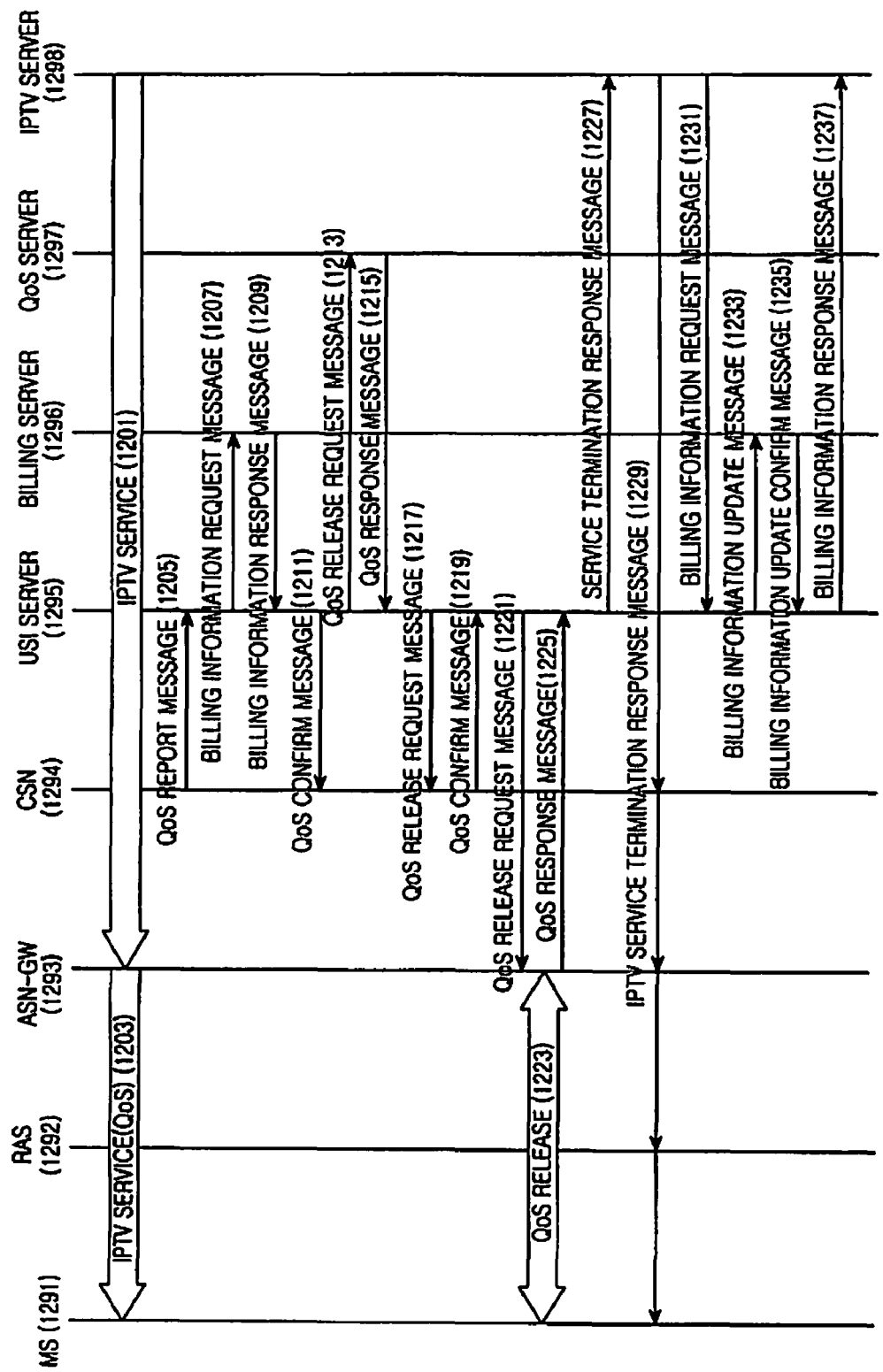
FIG. 12 is a signal flow diagram for a process of requesting termination of the IP service by the USI server in the communication system according to an exemplary embodiment of the present invention.

FIG. 12 is a diagram illustrating a signal flow for a process of requesting termination of the IP service by the USI server in the communication system according to an exemplary embodiment of the present invention. When the valid period of a current QoS class has expired or an allocated traffic amount has been exceeded, the USI server can request termination of the IPTV service.

Referring to FIG. 12, the communication system includes an MS 1291, a RAS 1292, an ASN-GW 1293, a CSN 1294, a USI server 1295, a billing server 1296, a QoS server 1297, and an IPTV server 1298.

The MS 1291 is receiving in steps 1201 and 1203 an IPTV service with a QoS class requested by the MS 1291 from the IPTV server 1298. When the valid period of the QoS class has expired or an allocated traffic amount has been exceeded, the CSN 1294 transmits in step 1205 a QoS report message to the USI server 1295, notifying that the on-going IPTV service with the QoS class cannot be further supported for the MS 1291.

In step 1207, the USI server 1295 transmits a billing information request message requesting billing information about the IPTV service provided so far to the billing server 1296. The billing server 1296 calculates the charge of the IPTV service of the QoS class provided so far to the MS 1291 and transmits in step 1209 a billing information response message to the USI server 1295 according to the charge.

The USI server 1295 transmits in step 1211 to the USI server 1294 a QoS confirm message confirming the QoS class of the IPTV service provided to the MS 1291 by the IPTV server 1298.

Steps 1213 to 1237 are identical to steps 1009 to 1033 illustrated in FIG. 10 and thus will not described in detail herein.

Figure 13:
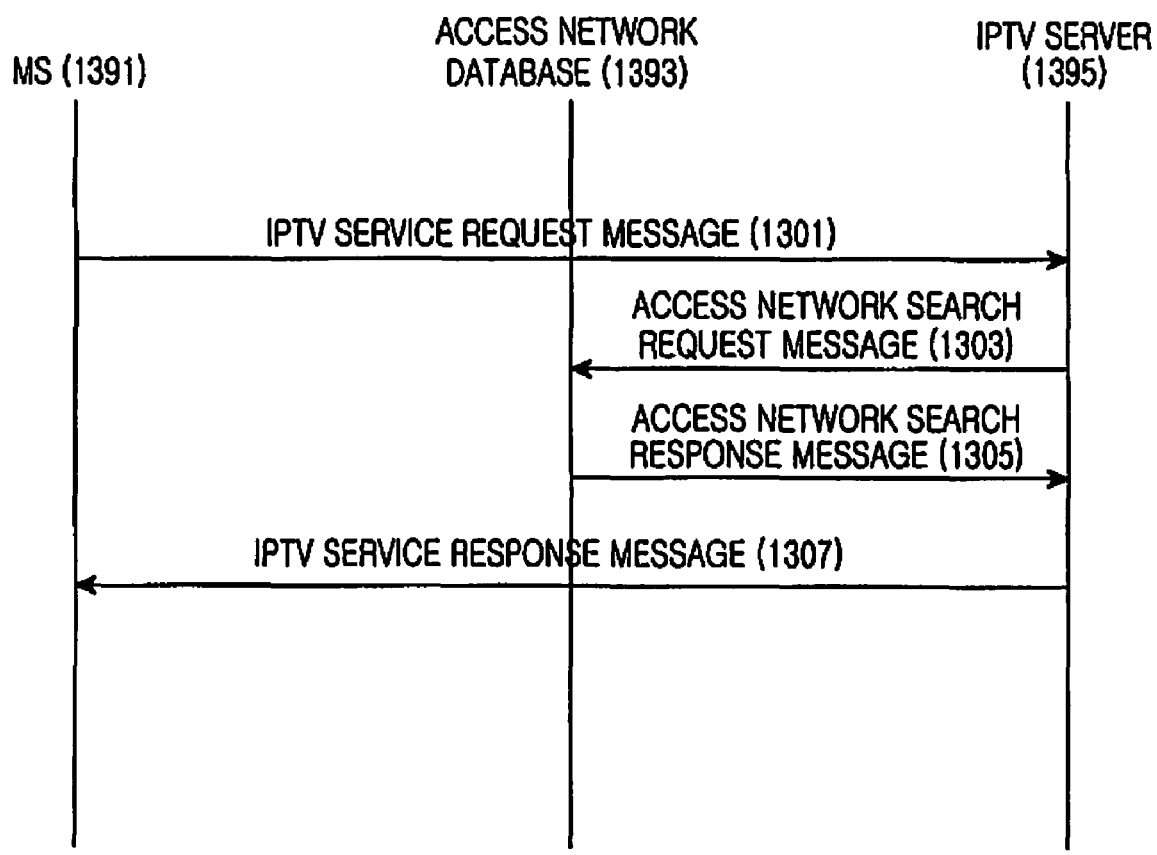
FIG. 13 is a signal flow diagram for a process of providing the IP service to the MS by the IP server in the communication system according to an exemplary embodiment of the present invention.

FIG. 13 is a diagram illustrating a signal flow for a process of providing the IP service to the MS by the IP server in the communication system according to an exemplary embodiment of the present invention.

Referring to FIG. 13, an MS 1391 transmits in step 1301 an IPTV service request message to an IPTV server 1393. The IPTV server 1395 transmits in step 1303 an access network search request message to an access network database 1393 in order to determine whether an access network to which the MS 1391 is connected can be supported by a USI server.

In step 1305, the access network database 1393 determines if the USI server can support the access network of the MS 1391 by comparing an IP address of the access network of the MS 1391 with IP addresses stored in the access network database 1393 and transmits an access network search response message including information about the search result to the IPTV server 1395.

In accordance with the received access network search response message, the IPTV server 1395 transmits in step 1307 to the MS 1391 an IPTV service response message including information about a QoS class for the IPTV service that can be supported over the access network.

As is apparent from the above description, the present invention advantageously provides a high-quality service as requested by an MS since the MS selects a desired QoS class for the service. Furthermore, an Internet service/content server can apply different billing regimes according to QoS classes for the service.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents.

What is claimed is:

1. A system for providing a service in a communication system, comprising:
 a service server for, upon receipt from a Mobile Station (MS) of a request for a provisioning of a service with a requested Quality of Service (QoS) class, transmitting a QoS information request message to an interface server and, upon receipt from the interface server of a QoS information response message for the QoS information request message, providing to the MS the service with the requested QoS class, wherein when the service server determines to terminate the service with the requested QoS class, the service server transmits to the interface server a service termination request message requesting deletion of a recording of the QoS class, and
 the interface server for receiving from a service server information about a Quality of Service (QoS) class requested for the service by a Mobile Station (MS), acquiring information indicating support of the requested QoS class, and providing the QoS support information to the service server, wherein when the interface server determines to change the QoS class of the service after providing the QoS support information to the service server, the interface server determines whether a valid period of the supported QoS class has expired or an allocated amount of traffic has been exceeded, wherein if the valid period of the supported QoS class has expired or the allocated amount of traffic has been exceeded, the interface server performs one of transmitting information about a new supported QoS class to the service server and notifying the service server that no further QoS class can be supported.

2. The system of claim 1, wherein when the service server provides the service with the requested QoS class to the MS, the service server charges the MS for the service at the requested QoS class.

3. The system of claim 1, wherein when the service server determines to change the QoS class of the service after providing the service, the service server transmits to the interface server a service request message requesting a QoS change.

4. The system of claim 1, wherein when the service server transmits a billing information request message requesting storage of billing information about the service with the QoS class, after transmitting the service termination request message.

5. The system of claim 1, wherein when the interface server provides the QoS support information to the service server, the interface server transmits billing information about the service with the requested QoS class to a billing server.

6. A method for providing a service in an interface server in a communication system, comprising:
 receiving information about a Quality of Service (QoS) class requested for the service by a Mobile Station (MS) from a service server;

acquiring information indicating support of the requested QoS class, and providing the QoS support information to the service server;

receiving a service termination request message requesting deletion of a recording of the QoS class from a service server, when it is determined to terminate the service with the requested QoS class;

determining if a valid period of the supported QoS class has expired or an allocated amount of traffic has been exceeded, when it is determined to change the QoS class of the service after providing the QoS support information to the service server; and performing one of transmitting information about a new supported QoS class to the service server and notifying the service server that no further QoS class can be supported, if the valid period of the supported QoS class has expired or the allocated amount of traffic has been exceeded.

7. The method of claim 6, further comprising transmitting billing information about the service with the requested QoS class to a billing server.

* * * * *